Jan. 3, 1933.    L. T. PEARCE    1,893,443
APPARATUS FOR MACHINING PROPELLER BLADES AND LIKE ARTICLES
Filed Nov. 4, 1929    7 Sheets-Sheet 6
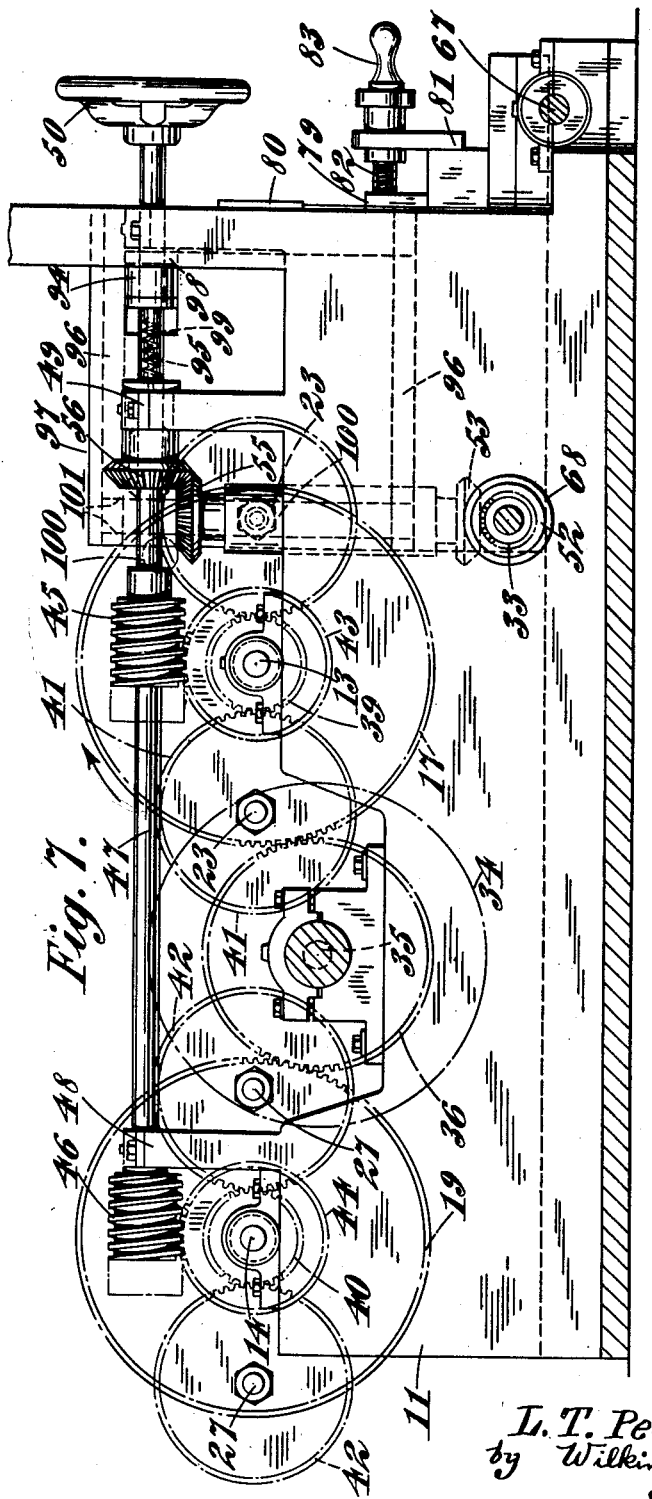
Inventor
L. T. Pearce
by Wilkinson & Giusta
Attorneys.

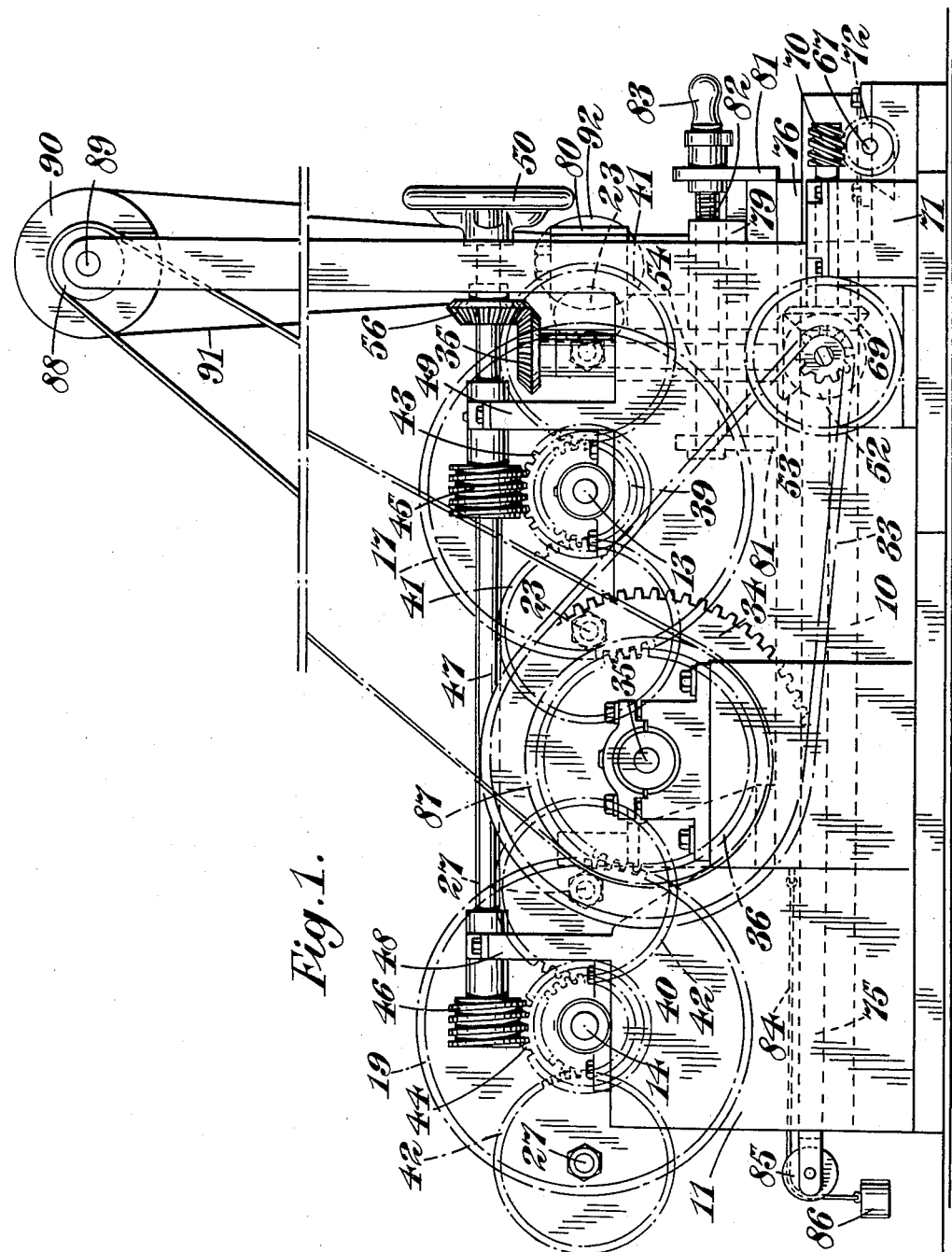

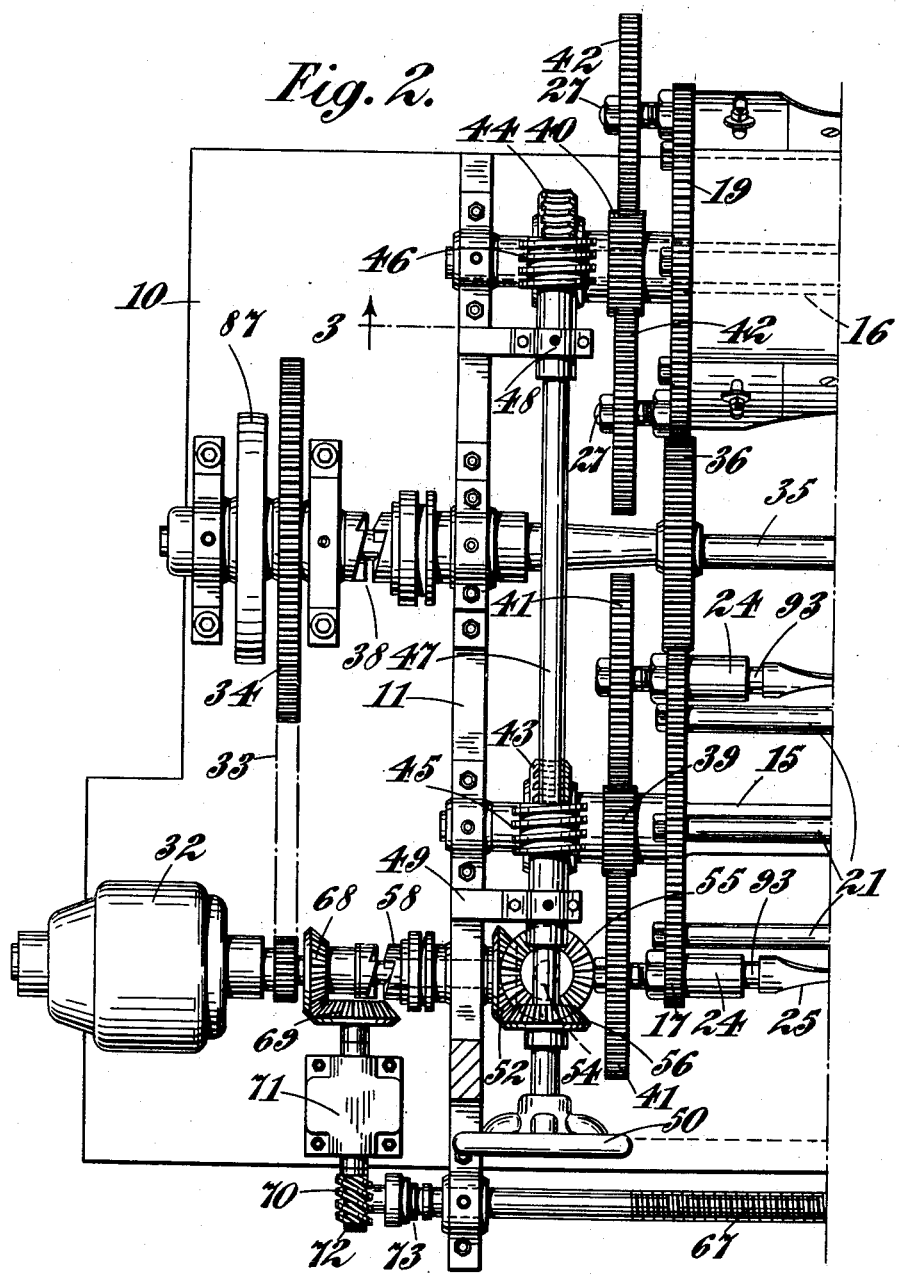

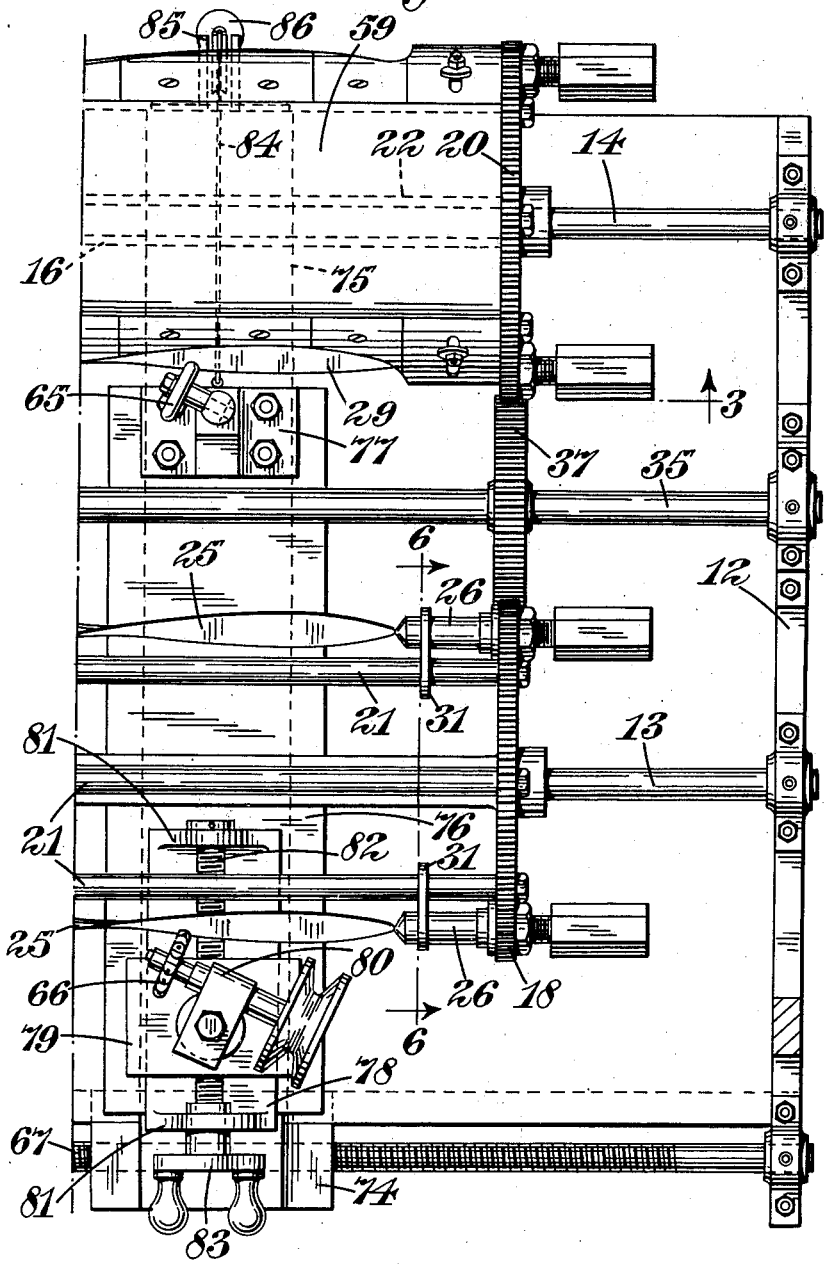

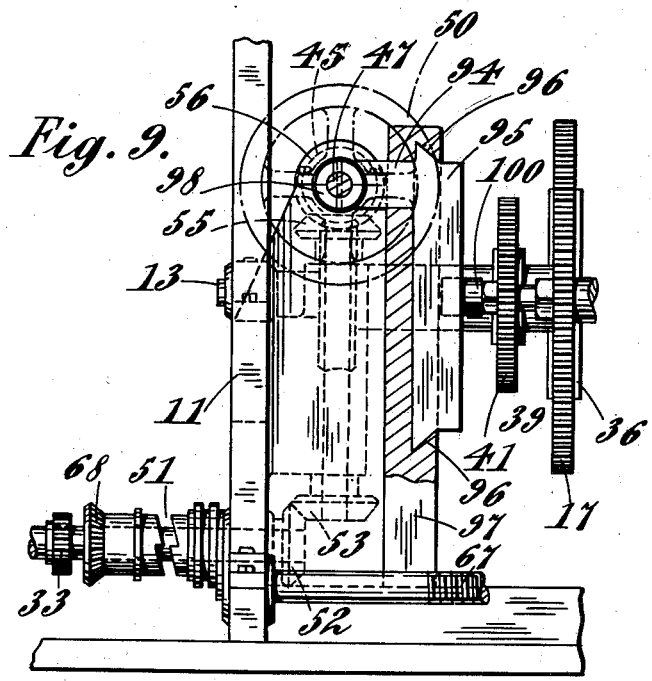
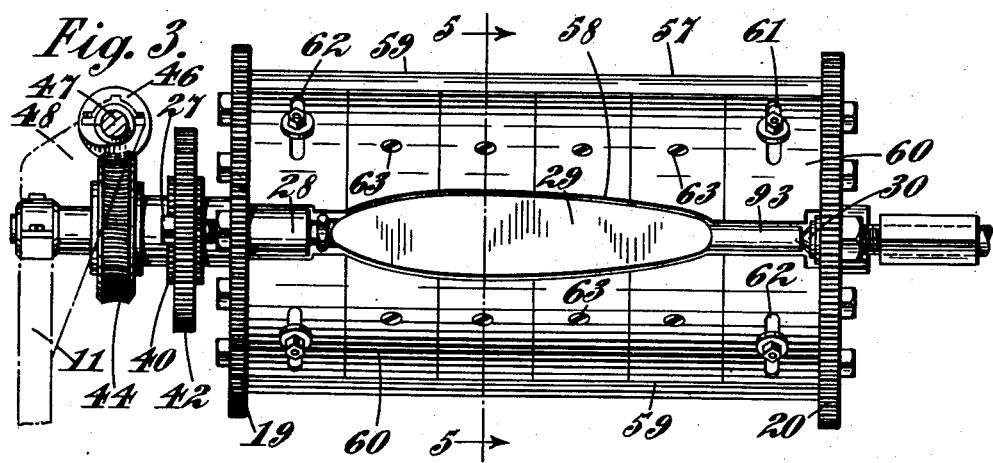

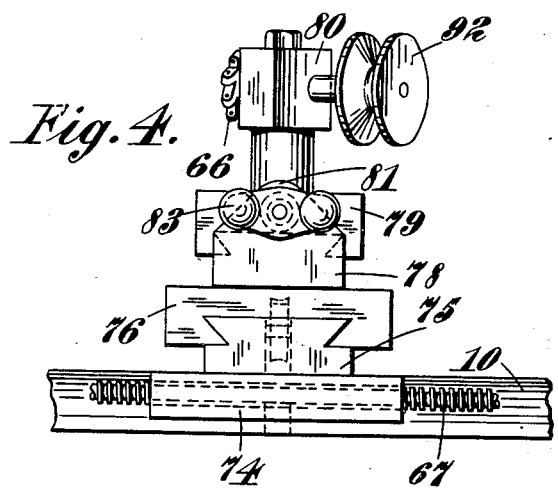
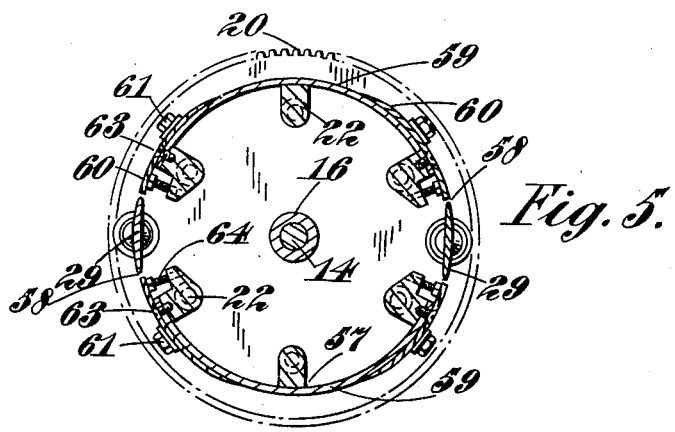
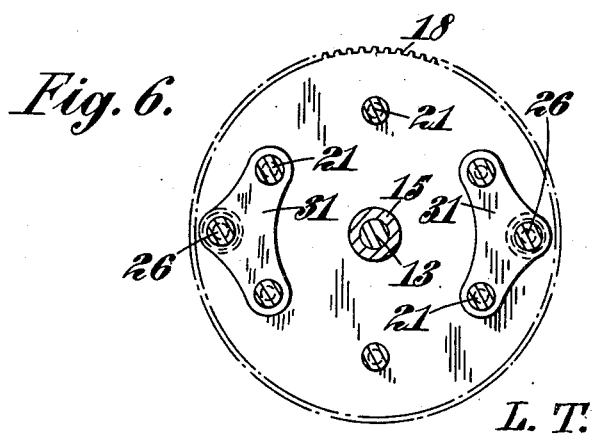

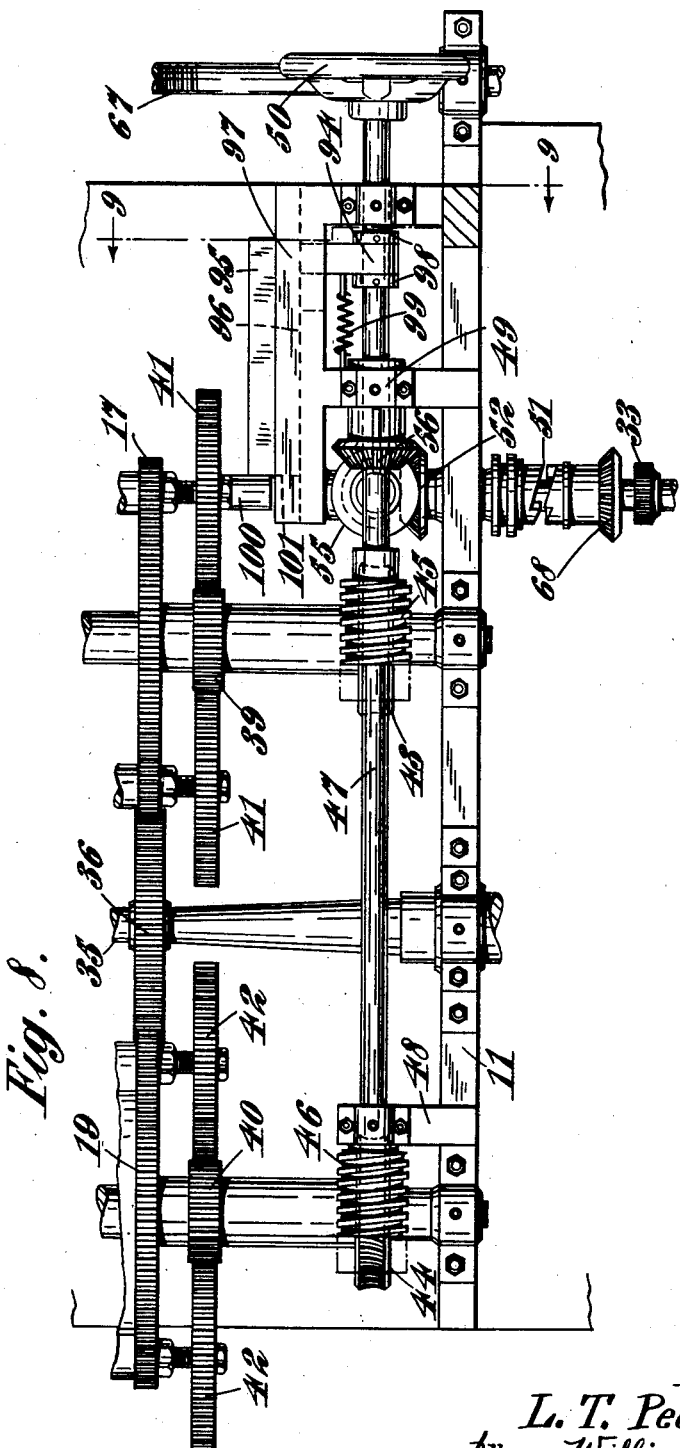

Patented Jan. 3, 1933

1,893,443

UNITED STATES PATENT OFFICE

LLEWELLYN THOMAS PEARCE, OF BRISTOL, ENGLAND, ASSIGNOR TO THE BRISTOL AEROPLANE COMPANY LIMITED, OF BRISTOL, ENGLAND, A BRITISH COMPANY

APPARATUS FOR MACHINING PROPELLER BLADES AND LIKE ARTICLES

Application filed November 4, 1929, Serial No. 404,767, and in Great Britain November 27, 1928.

This invention is for improvements in or relating to apparatus for machining propeller blades, e. g. for aircraft, and like articles of irregular cross-section and of considerably greater length than width.

Apparatus for this purpose is known comprising a pattern and a blank which are simultaneously rotated about their own axes, and a tool controlled by a follower-wheel engaging the pattern, which tool and follower-wheel are arranged to be traversed longitudinally of the blank and pattern respectively, e. g. by means of a rotatable screw-threaded shaft on which is a nut-like member operatively connected to the said tool and follower-wheel.

It has also been proposed to provide a milling machine particularly for shaping the cambered faces of metal air propellers, which machine comprises a blank and a pattern carried by an adjustable parallel linkage, and a tool and follower co-operating with the blank and pattern respectively. In this machine the tool (e. g. a milling cutter, a circular file, or an abrasive wheel) is rotatable and the arrangement is such that the edge of the tool cuts across the work while it is stationary and is traversed lengthwise of the work, i. e. at right angles to the transverse cut thus made, so that when the tool has traversed the length of the work, a longitudinal cut a narrow width has been taken on the work. The parallel linkage aforesaid is then adjusted so as to alter the position of the blank and pattern, and the tool is again traversed the length of the work so as to produce another longitudinal cut, and these operations are repeated until the work is completely formed.

One object of the invention is to provide an improved apparatus whereby propeller blades and like articles or irregular cross-section can be more readily and expeditiously machined, e. g. turned, ground or polished, than is possible with apparatus at present known for this purpose.

According to one feature of the present invention there is provided an apparatus for machining propeller blades and like articles of irregular cross-section and of considerably greater length than width, which comprises means for conveying a pattern and a blank or work-piece by a continuous movement bodily past (e. g. in a closed path) a follower-wheel or the like and a tool or the equivalent respectively in the general direction of the width of the article to be machined, and means for traversing the tool lengthwise of the blank or work-piece, all so arranged that the work will be formed by a series of cuts taken during one stroke of the tool and each extending substantially the entire width of said article.

Another feature of the invention consists in the provision of means for turning the pattern and blank aforesaid so as alternately to present opposite sides of the pattern and the blank to the follower-wheel and the tool respectively. This reversal of the pattern and of the blank may take place in successive movements of the former past the latter or at other intervals as desired; the expression "turning said pattern and blank so as alternately to present" is intended to cover both arrangements.

According to a further feature of the invention apparatus for the purpose set forth comprises in combination a rotatable carrier on which a pattern is mounted so as to form a part of the periphery of said carrier, a follower-wheel or the equivalent, means for continuously rotating said carrier so as to convey the pattern bodily past the follower-wheel, which carrier constitutes a stop to limit the movement of the follower-wheel in one direction, and a rotatable carrier for the blank which is arranged to be operated upon by a tool controlled by said follower-wheel.

In a convenient construction two rotatable substantially cylindrical carriers are provided, one having the pattern and the other the blank mounted on the periphery thereof respectively so as to be free to rotate about their own axes, together with means for rotating said carriers at the same speed from a common driving member.

The above and other features of the invention will be fully described hereinafter and specifically pointed out in the appended claims.

For a more complete understanding of the invention one embodiment thereof for machining aircraft propeller blades will be described, by way of example, with reference to the accompanying drawings from which its general application will be readily understood.

In the drawings:—

Figure 1 is an end elevation of the apparatus.

Figure 2 is a plan of the left hand half of the apparatus shown in Figure 1, and Figure 2A is a plan of the right hand half thereof.

Figure 3 is a section on the line 3—3 of Figure 2,

Figure 4 is an elevation of the tool-holder and the slide on which it is mounted, Figure 5 is a section on the line 5—5 of Figure 3, Figure 6 is a section on the line 6—6 of Figure 2a.

Figure 7 is an end elevation drawn to a larger scale showing a slightly modified construction of the apparatus illustrated in Figures 1–6.

Figure 8 is a plan of the parts shown in Figure 7, and

Figure 9 is a section on the line 9—9 of Figure 8.

Like reference numerals denote similar parts in the various figures of the drawings.

Referring more particularly to Figures 1 to 6 of the drawings, the apparatus comprises a base 10 and two vertical end frame-members 11, 12. Extending longitudinally of the apparatus and rotatably mounted in bearings carried by said frame-members, are two shafts 13, 14. Each of these shafts is surrounded by a sleeve 15, 16 respectively free to rotate thereon. The sleeve 15 has at its ends two flanges or discs 17, 18 and the sleeve 16 is provided with two similar flanges 19, 20. The flanges on the sleeves 15, 16 are connected together by stays 21, 22 respectively of any convenient cross-section having reduced ends to provide shoulders against which the flanges abut; the said reduced ends are screw-threaded and provided with nuts whereby the flanges and stays are secured together. Rotatably mounted in the flange 17 near its periphery and in diametrically opposite positions are two shafts 23 each having secured to its inner end a chuck 24 which engages one end of a blank 25; the other end of said blank is supported by a tail-piece 26 carried by the flange 18. In the flange 19 two shafts 27 are mounted similarly to the shafts 23 and each has a chuck 28 secured to its inner end to engage one end of a pattern 29. The other end of said pattern is supported by a tail-piece 30 mounted in the flange 20. Each of the tail-pieces 26 is further supported by a steadying-plate 31 mounted on the stays 21, see especially Figure 6, and if desired similar steadying-plates may be provided for the tail-pieces 30.

From the foregoing description it will be apparent that the sleeve 15, flanges 17, 18 and stays 21 together constitute a rotatable carrier for the blanks 25, and that the sleeve 16, flanges 19, 20 and stays 22 form a similar carrier for the patterns 29.

The two carriers aforesaid are rotated at the same speed and in the same direction from an electric motor 32 which by means of chain gear 33 drives a chain-wheel 34 arranged by the aid of a clutch 38 (see Figure 2) to drive a shaft 35 which extends longitudinally of the apparatus between the shafts 13, 14. Secured to the shaft 35 are pinions 36, 37 which mesh with teeth on the peripheries of the flanges 17, 19 and 18, 20 respectively. The blanks 25 and the patterns 29 are turned while the carriers are rotating by two sets of epicyclic gearing now to be described. Secured to the shafts 13, 14 are two sun-wheels 39, 40 respectively. The sun-wheel 39 gears with two planet-wheels 41 fixed to the outer ends of the shafts 23, and the sun-wheel 40 meshes with two planet-wheels 42 similarly mounted on the shafts 27. Also secured to the shafts 13, 14 are two worm-wheels 43, 44 which respectively engage worms 45, 46 on a transverse shaft 47 mounted in suitable bearings carried by brackets 48, 49 on the end frame 11.

The sun-wheels 39, 40 have half the number of teeth on the planet-wheels 41, 42 and are held from rotating, unless the shaft 47 is turned as hereinafter described, by reason of the engagement of the worms 45, 46 with the worm-wheels 43, 44 respectively.

When the shaft 35 is driven, the pinions 36, 37 cause the pattern-carrier and the blank-carrier to rotate so that the planet-wheels 41, 42 are carried round the sun-wheels 39, 40 and at the same time rotate on their own axes. It will be apparent that the blanks 25 and the patterns 29 are continually being turned as the carriers rotate, and that owing to the ratio of the teeth on the sun-wheels and planet-wheels each pattern and blank is reversed once each revolution of the carrier.

The worm-shaft 47 can be turned manually by means of a hand-wheel 50 secured thereto, or it can be driven from the motor 32 by any convenient gearing which includes a clutch so that the said motor can be disconnected from the shaft 47 at will. In the construction shown in the drawings the motor is arranged to drive through a clutch 51, see Figure 2, a bevel-wheel 52 which meshes with a bevel-wheel 53 on the lower end of a vertical shaft 54. At the upper end of said shaft is a bevel-wheel 55 which gears with a bevel-wheel 56 fixed to the shaft 47.

The purpose of turning the shaft 47 will be described hereinafter.

The pattern-carrier in addition to the parts hereinbefore described comprises a substantially cylindrical shell 57 provided with two longitudinal openings 58 shaped to conform approximately to the contour of the longitudinal edges of the pattern 29, see Figures 3 and 5. This shell may conveniently be formed by a number of thin suitably bent plates arranged longitudinally, transversely, or both of the carrier as may be most convenient. In the construction shown in the drawings there are two longitudinal plates 59 and a number of transverse plates 60. The two end plates 60 are adjustably secured to the plates 57 by means of bolts 61 passing through slots 62 in the end plates 60, and the other transverse plates are detachably mounted on the stays 22 by countersunk screws 63. The ends of the plates 60 adjacent the openings 58 overhang the stays 22 and adjustable stops 64 carried by said stays are provided to support said overhanging ends. The edges of the plates 60 bounding the openings 58 are shaped to conform to the contour of the adjacent edges of the pattern 29, and preferably are interchangeable so that suitably shaped openings can be provided to accommodate blanks having edges of different shapes. The substantially cylindrical shell thus formed constitutes a path for a follower-wheel 65 (see Figure 2A) and also serves to limit the movement of the follower-wheel in one direction.

The follower-wheel 65 and a tool 66 are arranged to move together by means of any convenient anti-friction mounting, and any suitable means may be provided for traversing them longitudinally of the pattern and blank respectively. The kind of tool employed will depend upon the nature of the work to be performed, for instance it may be a milling cutter, grinding wheel or polishing buff.

In the embodiment illustrated in the drawings, the follower-wheel and the tool are traversed by means of a screw 67 rotatably mounted in the frame-members 11, 12. The said screw is rotated from the motor 32 by means of bevel-wheels 68, 69 which drive a worm 70 through any suitable reduction-gear enclosed in a gear box 71, see Figure 2. The worm 70 meshes with a worm-wheel 72 whereby the screw 67 is driven, a friction-clutch 73 being interposed between the worm-wheel 72 and said screw so that the latter may be declutched from the motor at will. Mounted on the screw 67, see especially Figure 4, is a nut-like member 74 integral with a saddle 75 arranged to slide longitudinally of the apparatus on the base 10. Mounted on the saddle 75 is a cross-slide 76 which has at its rear end a support 77 for the follower-wheel 65. Secured to the cross-slide 76 is a second saddle 78 on which is mounted a second cross-slide 79 carrying the tool-holder 80. The cross-slide 79 is U-shaped in longitudinal cross-section and in its vertical walls 81 a screw-thread rod 82 is rotatably mounted. The slide 79 is mounted as a nut on the rod 82 and the latter can be turned by means of a handle 83 or the equivalent. A cable 84 is secured at one end to the slide 76 and at its other end passes over a pulley 85 and is attached to a weight 86. Obviously, if desired said slide may be spring-controlled. Thus the tool 66 is always held up to the blank 25 and the follower-wheel is free to follow the surface of the pattern 29 and the cylindrical shell 57 of the pattern-carrier. By turning the handle 83 the tool 66 can be adjusted towards or away from the follower-wheel 65 to permit articles of different thickness from the blank to be produced or operated upon by the apparatus. This enables wooden patterns to be used of larger cross-section than the articles required thereby securing extra strength in the patterns.

As shown in the drawings the tool is arranged to be rotated from the motor 32 by means of a belt passing around a pulley 87 arranged to rotate with the chain-wheel 34 and a pulley 88 on an overhead shaft 89, and a pulley 90 connected by a cable 91 to a V-pulley 92 on the axle of the tool 66, but any other convenient driving means for the tool may be employed.

The operation of the apparatus described above is as follows:—Two patterns are mounted in the pattern-carrier and two blanks in the blank carrier. The follower-wheel 65 and the tool 66 are then adjusted so that they will engage the patterns and the blanks respectively when the carriers are rotated. The clutches 38 and 73 are closed and the clutch 51 is opened. When the electric motor 32 is started, the shaft 35 will be driven and through the pinions 36, 37 and toothed flanges 17, 18 and 19, 20 will cause the blank-carrier and the pattern-carrier to rotate. The sun-wheels 39, 40 of the epicyclic gears are held stationary as hereinbefore described. Consequently the planet-wheels 41, 42 are carried round the sun-wheels and at the same time rotate on their own axes. The patterns 29 and blanks 25 are thus caused to be turned, and at each revolution of the carriers opposite sides of the patterns and blanks are presented to the follower-wheel 65 and to the tool 66 respectively. The numbers of the teeth on the sun-wheels and the planet-wheels are chosen so that one of the side faces of the patterns or blanks will be presented to the follower-wheel or tool as said patterns or blanks pass said wheel or tool respectively. Simultaneously the screw 67 is turned by means of the gearing 68, 69, 70 and 72 so that the follower-wheel 65 and the tool 66 are traversed longitudinally of the patterns and blanks respectively, and the tool is rotated by the belt gear hereinbefore described. Any convenient means forming no part of the present invention may be provided to enable the saddle 75 to be released from the screw 67, when desired, to permit said saddle to be moved independently of said screw.

It will be appreciated that the patterns 29 and blanks 25 are being turned during the time that they are passing the follower-wheel 65 and the tool 66 respectively. Owing to this turning movement, the side faces of the blanks 25 and of the patterns 29 may become inclined to the periphery of the carrier on which they are mounted respectively. The best operating position is when the side faces of the pattern 29 are aligned with the periphery of the shell 57 of the pattern-carrier. This position can be maintained while the pattern 29 is passing the follower-wheel 65 by turning the hand-wheel 50 which through the worm 46 and worm-wheel 44 causes the sun-wheel 40 to turn and thus adjusts the positions of the patterns 29 relatively to the shell of the pattern-carrier. The worm 45, worm-wheel 43 and sun-wheel 39 cause a similar adjusting movement to be imparted to the blanks 25.

With the apparatus working as described above, the side faces of the blanks 25 are operated upon by the tool 66. When it is desired to machine or otherwise operate upon the longitudinal edges of the patterns, a rotary motion of the pattern- and blank-carriers is not required but the tool has to traverse the patterns longitudinally. This is effected by opening the clutches 38 and 51 and closing the clutch 73 when no motion will be imparted to the said carriers or to the patterns and blanks but the slide 75 will be traversed along the screw 67. Also, it will be seen that a rotary motion of the carriers is not required when the sockets 93, see Figures 2 and 3, on the blanks are to be turned. In order to turn said sockets the clutch 38 is opened and the clutches 51 and 73 are closed. By this means, the worm-shaft 47 is driven as hereinbefore described and consequently the planet-shafts 23 and 27 together with the patterns and blanks are rotated.

The apparatus hereinbefore described may also comprise means for stopping the turning movement of the patterns or blanks while they are being conveyed past the follower-wheel or tool respectively. For instance, when epicyclic gearing as described above is employed to turn said patterns or blanks, automatically operated means may be provided for rendering said gearing inoperative. A convenient construction for this purpose is shown in Figures 7-9 of the drawings.

In this construction the worm-shaft 47 is free to slide endwise in its bearings in the brackets 48 and also in the bevel-wheel 56 whereby it can be rotated from the motor 32 by means of suitable key-and-slot connections. The said shaft also passes freely through a boss 94 on a slide 95 arranged to slide in guide-ways 96, see Figure 9, in a standard 97 secured in any convenient manner to the frame of the apparatus. The boss 94 is received between two shoulders 98, one or both of which is or are detachably fixed on the shaft 47. A tension spring 99 is secured at one end to the bracket 49 and at its other end to the boss 94. Mounted on the outer end of one of the planet shafts 23 is a roller 100 which as the corresponding planet-wheel 41 revolves around the sun-wheel 39 in the direction of the arrow in Figure 7, engages the face 101 of the slide 95 and pushes said slide to the right as seen in said figure. This movement of the slide produces an endwise movement, also to the right, of the shaft 47 carrying the worms 45, 46 which are thereby caused to rotate the sun-wheels 39, 40 in a clockwise direction. The said sun-wheels drive the planet-wheels in an anti-clockwise direction so that the patterns 29 and the blanks 25 are turned anti-clockwise to compensate more or less for the clockwise turning movement imparted to them by the planet-wheels which revolve around the sun-wheels in a clockwise direction. This compensating movement maintains the patterns substantially in alignment with the periphery of the shell 57 of the pattern-carrier whilst they are passing the follower-wheel 65. If desired, the end face 101 of the slide 95 instead of being straight as shown may be cam-shaped so as to compensate exactly for the normal turning movement imparted to the patterns and blanks and consequently ensure that said patterns and blanks will be held stationary relatively to their respective carriers when passing the follower-wheel and the tool. It will be appreciated that the patterns and blanks are held stationary relatively to the carriers, or substantially so, during the period which elapses from the time that the roller 100 engages the end face 101 of the slide and the time that said roller reaches the end of its travel to the right in Figure 7. This period is arranged to coincide approximately with the time occupied by the patterns and blanks in passing the follower-wheel and the tool. When the roller begins to move towards the left in Figure 7, the spring 99 comes into action and forces the slide 95 and consequently the worms 45, 46 to the left. This backward movement of the worms speeds up the turning movement of the patterns and blanks in the normal direction until the slide has reached its normal position to the left when the patterns and blanks are turned normally by the epicyclic gearing as hereinbefore described.

The invention is not restricted to the precise constructional details described as various changes may be made without departing from the invention. For instance, any convenient number of patterns and blanks may be arranged on the carriers (the epicyclic gearing being designed accordingly) and the carriers for the patterns and the blanks may be arranged one above the other instead of side by side. If desired, a separate electric motor may be provided for driving the tool. Also, any devices known in engineering practice which will enhance the smooth running or increase the efficiency or life of the apparatus may be incorporated therein. Thus, the pinions 36, 37 and the sun-wheels 39, 40 may be made in two parts to take up backlash. Also, the worms 45, 46 may be adjustably mounted on eccentric bushes for the same purpose. Furthermore, the roller 100 instead of operating the slide 95 may be arranged to actuate a lever operatively connected by a pin and slot connection to the worm shaft 47 so as to move the latter endwise.

I claim—

1. Apparatus for machining blade-like articles, comprising two carriers, one adapted to have a pattern and the other a blank mounted thereon, a pattern-follower and a tool, means for traversing the follower and the tool lengthwise of the pattern and blank, and means for continuously moving said carriers so as repeatedly and intermittingly to convey the pattern and the blank bodily past and in contact with the follower and the tool in a direction transverse to the traversing movement of the tool so as to form the work by a series of cuts extending entirely across the blank and produced during one stroke of the tool.

2. Apparatus for machining articles of irregular cross-section, comprising a pattern-follower and a tool, means for conveying a pattern and a blank bodily past the follower and the tool respectively, and means for turning said pattern and blank so as alternately to present opposite sides thereof to the follower and the tool respectively.

3. Apparatus for machining articles of irregular cross-section, comprising a substantially cylindrical rotatable carrier on which a pattern is mounted so as to form a part of the periphery of the carrier, a pattern-follower, means for rotating said carrier so as to convey the pattern bodily past said follower, which carrier constitutes a stop to limit the movement of the pattern-follower in one direction, a tool controlled by said follower, and means for conveying a blank bodily past the tool in a similar path to that traversed by the pattern.

4. Apparatus for machining substantially flat articles of irregular cross-section comprising a substantially cylindrical carrier having a pattern mounted thereon and including a part of the periphery of said carrier, a second carrier having a blank mounted thereon, means for rotating said carriers, a pattern-follower and a tool arranged to engage said pattern and blank respectively, means for turning said pattern and blank about their own axes so as alternately to present opposite sides thereof to the follower and the tool respectively, and means whereby said turning-means can be adjusted during the operation of the apparatus so as to align the outer surface of the pattern with the periphery of the rotatable carrier on which it is mounted and impart a similar movement to the blank.

5. In apparatus for machining articles of irregular cross-section, the combination of two rotatable carriers, a pattern support rotatably mounted on one carrier, a blank support mounted to rotate on the other carrier, said supports being free to rotate about their own axes, a pattern-follower and a tool and means for traversing them lengthwise of the pattern and the blank respectively, and means for rotating said carriers and said pattern and blank comprising a toothed wheel on each carrier, a pinion meshing with both of said toothed wheels, means for driving said pinions, and two sets of epicyclic gearing for turning the pattern and the blank respectively about their own axes.

6. The combination, in apparatus for machining articles of irregular cross-section, of two shafts, a sleeve loosely mounted on each shaft, a pattern-carrier secured to one of said sleeves and a blank-carrier secured to the other, a plurality of patterns and blanks on said carriers respectively, means for rotating the carriers, a sun wheel on each of said shafts meshing with planet wheels on the corresponding carrier, which planet wheels are arranged to rotate the patterns and blanks about their own axes, a worm-wheel on each of the shafts carrying the sun-wheels aforesaid, a worm-shaft extending across the apparatus and having on it two worms each meshing with one of said worm-wheels, means for rotating said worm-shaft and a pattern-follower and a tool and means for traversing them lengthwise of the pattern and the blank respectively.

7. Apparatus for machining articles of irregular cross-section and of considerably greater length than width, comprising two rotatable carriers one having a pattern and the other a blank mounted thereon, a pattern-follower and a tool arranged to engage the pattern and the blank respectively, means for traversing the pattern follower and the tool lengthwise of the pattern and the blank respectively, a toothed wheel at each end of each of said carriers, a shaft disposed between the carriers parallel to their axes and carrying two pinions arranged thereon so that each meshes with a toothed wheel on each carrier, and means for driving said shaft so as to rotate the carriers thereby conveying the pattern and the blank bodily past the follower and the tool respectively in the general direction of the width of the article to be machined.

8. A pattern-carrier for use in apparatus for machining substantially flat articles of irregular cross-section and of greater length than width, comprising a substantially cylindrical portion formed by suitably curved plates which are arranged to provide an opening in said cylindrical portion, the edges of said plates which form said opening being shaped to conform to the adjacent edges of the pattern.

9. A pattern-carrier for use in apparatus for machining substantially flat articles of irregular cross-section, comprising a substantially cylindrical portion formed by a number of suitably curved plates which are arranged to provide an opening in said cylindrical portion within which a pattern can be mounted, the plates forming said opening being detachably mounted on the carrier and interchangeable to accommodate patterns having edges of different shapes.

10. In apparatus for machining articles of irregular cross section, a pair of rotatable carriers, an independently rotatable pattern support on one of said carriers, an independently rotatable blank support on the other carrier, means for turning the carriers uniformly and equally, independent means for turning said supports uniformly and equally, a pattern follower, and a tool connected to the follower for relative movement therewith, the follower and the tool adapted for intermittent contact with the respective pattern and blank during the rotation of said carriers.

11. Apparatus for machining articles of irregular cross section, comprising two substantially cylindrical carriers, a common driving member connected to said carriers for rotating the same simultaneously and equally, a pattern support mounted to turn on one carrier, a blank support mounted to turn on the other carrier, and interconnected means between the pattern and blank supports for rotating the same about their respective axes independently of the rotation of the carriers and pattern follower, a tool connected to the follower for relative movement therewith, means for supporting the follower and the tool for intermittent engagement respectively with a pattern and a blank mounted in the respective supports, and means for transferring the follower and the tool longitudinally of the pattern and the blank respectively.

12. In apparatus for machining articles of irregular cross section, two rotatable carriers, a pattern support on one carrier, a blank support on the other carrier, which supports are mounted for independent rotation on the carriers, means for rotating said carriers simultaneously and equally, an epicyclic gear train on each carrier connected to the respective support thereon for turning the support on its own axis independently of the rotation of the carrier, and manually operable adjusting means for the epicyclic gear trains for varying the positions of the pattern and blank supports relatively to their carriers during the operation of the apparatus.

13. Apparatus for machining articles of irregular cross section, comprising two carriers, a pattern support on one carrier, a blank support on the other carrier, said supports mounted on the carriers for free rotation thereon about their own axes, a pattern follower, a tool connected to the follower for relative movement therewith, supporting means for the follower and the tool for holding the same in position for intermittent engagement with the work during the turning of the carriers, means for rotating the carriers, and means for turning the pattern and work supports on their respective axes during the rotation of the carriers.

14. Apparatus for machining substantially flat articles of irregular cross-section, comprising a rotatable pattern carrier, a rotatable blank carrier, holders on said carriers for supporting the ends of a pattern and a blank respectively, which holders are eccentrically arranged on the carriers, a pattern-follower and a tool, means for traversing the follower and the tool lengthwise of the pattern and blank, means for rotating the said carriers to convey the pattern and the blank bodily past said follower and the tool respectively, and means including an arrangement of epicyclic gearing for turning the pattern and blank about their own axes, which gearing comprising planet wheels co-axial with and operatively connected to the pattern and blank respectively and of such a ratio relatively to the sun wheels with which they co-operate that side faces of the pattern and blank will be presented to the follower and tool respectively.

15. Apparatus for machining articles of irregular cross-section, comprising a movable pattern carrier, a movable blank carrier, a pattern-follower and a tool, means for moving said carriers to convey a pattern and a blank bodily past said follower and the tool respectively, means operating during the movement of said carriers for continuously turning the pattern and blank so as alternately to present opposite sides thereof to the follower and the tool respectively, and means for stopping the turning movement of the pattern and blank while they are being conveyed past the follower and tool.

16. Apparatus for machining articles of irregular cross-section, comprising a movable pattern carrier, a movable blank carrier, a pattern-follower and a tool, means for continuously moving said carriers to convey a pattern and a blank bodily past said follower and the tool respectively, means including an arrangement of epicyclic gearing operatively connected to this pattern and blank for turning them about their own axes so as alternately to present opposite sides thereof to the follower and tool respectively, and automatically operated means for rendering said epicyclic gearing inoperative.

17. A pattern-carrier for use in apparatus for machining substantially flat articles of irregular cross-section comprising a frame, a substantially cylindrical shell carried by the frame, and having an opening therein shaped to conform approximately to the contour of the edges of the pattern, and holders on the frame for supporting the pattern within said opening.

18. Apparatus for machining articles of irregular cross-section and of considerably greater length than width, comprising a movable pattern carrier, a movable blank carrier, a pattern follower and a tool, means for continuously moving said carriers to convey a pattern and a blank bodily past said follower and the tool respectively, means for traversing the follower and tool lengthwise of the pattern and blank, means for turning the pattern and the blank so as alternately to present opposite sides thereof to the pattern and the tool, and means whereby the actuating means for the carriers aforesaid can be rendered inoperative.

19. Apparatus for machining articles of irregular cross-section and of considerably greater length than width, comprising a movable pattern carrier, a movable blank carrier, a pattern-follower and a tool, means for continuously moving said carriers to convey a pattern and a blank bodily past said follower and the tool respectively, means for traversing the follower and tool lengthwise of the pattern and blank, means for turning the pattern and the blank so as alternately to present opposite sides thereof to the pattern and the tool, and means whereby the means aforesaid for turning the pattern and the blank can be rendered inoperative.

20. In apparatus for machining articles of irregular cross-section and of considerably greater length than width, a pattern-follower, a tool connected to the follower for relative movement therewith, end supports for a pattern, end supports for a blank to be machined, movable carriers on which said supports are mounted, operating means for continuously moving the carriers so as repeatedly to convey the pattern and the blank bodily past and in contact with the follower and the tool respectively in the general direction of the width of the blank, and means for traversing the follower and the tool lengthwise of the pattern and the blank respectively to cause the tool at each stroke to effect a series of cuts extending substantially the entire width of said articles.

21. In apparatus for machining substantially flat articles of irregular cross-section, the combination of a rotatable pattern carrier, a rotatable work carrier arranged parallel to the pattern carrier, each of which carriers comprises two flanges and a support on each flange arranged at a distance from the axis of the carrier and so as to permit a pattern to be mounted between the supports on one of said carriers and a blank to be mounted between the supports on the other carrier, a pattern follower and a tool movable relatively to the pattern and work respectively, a driving shaft situated between the carriers aforesaid, and means for rotating the carrier from the said common driving shaft.

22. In apparatus for machining substantially flat articles of irregular cross-section, the combination of a rotatable pattern carrier, a rotatable work carrier arranged parallel to the pattern carrier, two toothed-wheels spaced apart on each carrier, a support mounted on each toothed wheel at a distance from the axis of the carrier and so as to permit a pattern to be mounted between the supports carried by the toothed-wheels on one carrier and a blank to be mounted between the supports carried by the toothed-wheels on the other carrier, a follower and a tool movable relatively to the pattern and work respectively, a driving shaft situated between the carriers aforesaid, and two gear-wheels on the driving shaft each arranged to drive the corresponding toothed-wheels on the carriers.

In testimony whereof I affix my signature.
LLEWELLYN THOMAS PEARCE.